(No Model.)

H. R. TILLISON.
BELT PULLEY.

No. 593,366. Patented Nov. 9, 1897.

Witnesses:
Walter E. Lombard.
Thomas J. Drummond.

Inventor:
Hosea R. Tillison,
by Crosby & Gregory
Attys.

UNITED STATES PATENT OFFICE.

HOSEA R. TILLISON, OF BOSTON, MASSACHUSETTS.

BELT-PULLEY.

SPECIFICATION forming part of Letters Patent No. 593,366, dated November 9, 1897.

Application filed June 23, 1896. Serial No. 596,586. (No model.)

*To all whom it may concern:*

Be it known that I, HOSEA R. TILLISON, of Boston, county of Suffolk, State of Massachusetts, have invented an Improvement in Belt-Pulleys, of which the following description, in connection with the accompanying drawings, is a specification, like letters on the drawings representing like parts.

In the rotation of shafts through the medium of belts traveling over pulleys mounted on said shafts it has been found that the film of air drawn between the belt and the peripheral surface of the pulley by the rapidly-moving belt tends to raise the said belt out of proper contact with the pulley, thereby reducing the driving power of the belt. To obviate this, my present invention comprehends the grooving of the pulley-surface preferably in a spiral direction and providing the groove or grooves thus formed with one or more air-exits through which the air collecting in the said grooves may find an outlet. The grooves thus disposed upon the pulley also tend to center the belt thereupon.

Figure 1:
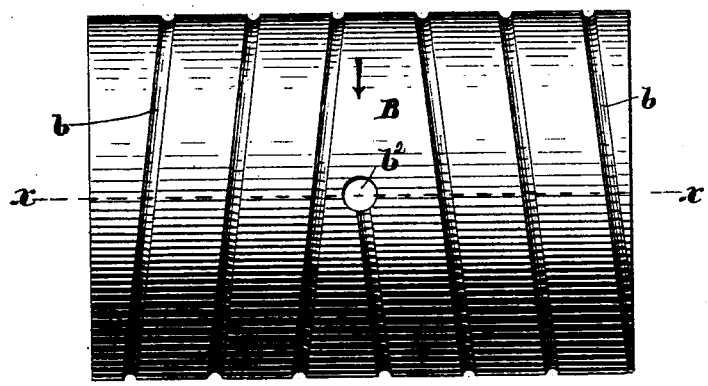
Figure 2:
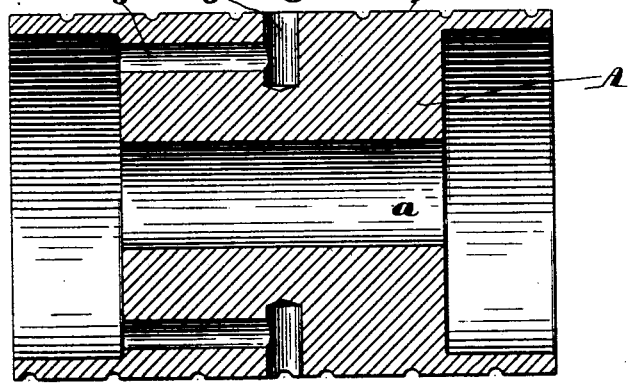

In the drawings, Figure 1, in side elevation, shows a pulley containing one embodiment of my invention; Fig. 2, a longitudinal section on the dotted line $x\,x$, Fig. 1; and Fig. 3, a side elevation of a pulley, illustrating a modification of my invention.

In the embodiment of my invention illustrated in Figs. 1 and 2 of the drawings the belt-pulley A is of any desired size, construction, or material, it, as herein shown, being provided with a central shaft-receiving opening $a$, furnishing means for mounting the pulley on the shaft which is to drive or to be driven. In accordance with my invention, as illustrated in said figures, I have provided the belt or peripheral surface B of the pulley with one or more, herein shown as two, spiral grooves or conduits $b\,b$ of low pitch, one of which is shown as a right and the other as a left hand spiral, said grooves starting from points at or near the middle of the pulley and winding outwardly toward and having their outlets at the ends of the pulley, so that any air drawn by the belt between the latter and the belt-surface of the pulley may find an outlet in or through these spiral grooves or conduits to the ends of the pulley, where it may escape. I have also provided at the inner end of each of the grooves, Fig. 1, an air-exit $b^2$, leading outwardly through the hub of the pulley, so that in whatever direction the pulley may travel the air in the grooves thereof will not only by its own pressure, but also by the rotative action of the pulley, tend to flow through said grooves and escape at the ends thereof or at such points as air-exits may be provided along the lines of said grooves. As many of these connected air-exits may be provided along the channels or grooves as may be found necessary for the particular use to which the pulleys are put. These grooves may be cast or turned in the belt-surface of the pulley and are thus extremely cheap, since they need not necessarily be deep grooves, and by laying them spirally or angularly—for instance, as in Figs. 1 and 2—a belt driving said pulley in the direction of the arrow, Fig. 1, or a belt being driven by said pulley in a direction opposite the arrow, Fig. 1, is acted upon by the walls of the spiral grooves and held in a proper central position upon the pulley, so that the usual crowning of the pulley at the middle may be reduced or in some instances entirely eliminated.

Figure 3:
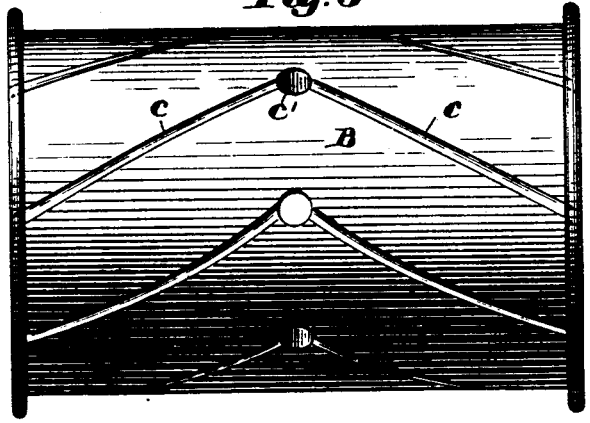

In Fig. 3 I have shown my invention as applied to a flanged pulley, of which many are used in woodworking machinery, and in the embodiment of my invention seen in Fig. 3 the grooves $c$, while angular and spiral, are provided with air-exits $c'$, the same as described and shown at $b^2$, Fig. 2, at their inner adjacent ends, and at their outer ends may be closed at the flanges or they may have exits through said flanges, as indicated in dotted lines.

Actual tests have shown a pulley embodying my invention to possess a very large percentage of gain in driving power over the ordinary smooth pulley.

An important advantage attained by my invention is that when the pulley is being driven in the direction of the arrow, Fig. 1, if there comes any tendency to slip or any actual slip of the belt on the pulley the moment there is a relative movement of the belt on the pulley the diverging walls of the groove tend to spread or iron the belt out laterally on and bring it into closer frictional contact with the surface of the pulley, and thereby tend to check the slip.

My invention of course is not limited to the particular embodiments herein shown, for the same may be varied without departing from the spirit and scope of my invention.

Having described my invention, what I claim as new, and desire to secure by Letters Patent, is—

1. A belt-pulley, having its belt-surface provided with one or more spiral grooves, each grooove extending one or more times around the pulley, substantially as described.

2. A belt-pulley, having its belt-surface provided with right and left spiral grooves, each groove extending one or more times around the pulley, substantially as described.

3. A belt-pulley, having its belt-surface provided with one or more spiral grooves, and air-exit openings from said grooves extending into the pulley at its middle, said openings having lateral branches leading from their lower ends to the outside, substantially as described.

4. A belt-pulley, having its belt-surface provided with belt-centering grooves each extending spirally with low pitch from the middle outward toward the end of said pulley, and one or more times about the pulley, substantially as described.

5. A belt-pulley, having its belt-surface provided with a spiral groove of low pitch, said groove being approximately parallel with the direction of movement of the belt, diverging therefrom only slightly, whereby the said groove in a fast-running pulley tends to move the belt laterally on the pulley, substantially as described.

In testimony whereof I have signed my name to this specification in the presence of two subscribing witnesses.

HOSEA R. TILLISON.

Witnesses:
EMMA J. BENNETT,
FREDERICK L. EMERY.